United States Patent [19]

Kitagawa et al.

[11] 3,933,754
[45] Jan. 20, 1976

[54] INSOLUBLE CHLOROPRENE POLYMER

[75] Inventors: Chojiro Kitagawa; Ichiro Fukuoka, both of Tokyo; Takashi Kadowaki, Niigata; Shoji Kimura, Machida; Takehiko Nishimura, Tokyo; Kanehisa Hanabusa, Niigata, all of Japan

[73] Assignee: Denki Kagaku Kogyo Kabushiki Kaisha, Tokyo, Japan

[22] Filed: July 24, 1974

[21] Appl. No.: 491,427

Related U.S. Application Data

[62] Division of Ser. No. 289,915, Sept. 18, 1972, Pat. No. 3,876,732, which is a division of Ser. No. 753,705, Aug. 19, 1968, Pat. No. 3,714,296.

[52] U.S. Cl.... 260/63 HA; 260/82.1; 260/85.5 XA; 260/86.3; 260/92.3; 260/890
[51] Int. Cl.² .................... C08F 15/26; C08G 2/26
[58] Field of Search............ 260/86.3, 92.3, 63 HA, 260/82.1, 85.5 XA, 86.3

[56] References Cited
UNITED STATES PATENTS

| | | | |
|---|---|---|---|
| 1,967,860 | 7/1934 | Carothers | 260/92.3 |
| 2,628,210 | 2/1953 | Eichason et al. | 260/86.3 |
| 3,300,433 | 1/1967 | Apotheker | 260/92.3 |
| 3,719,649 | 3/1973 | Jennes et al. | 260/92.3 |

*Primary Examiner*—Murray Tillman
*Assistant Examiner*—J. Ziegler
*Attorney, Agent, or Firm*—Sughrue, Rothwell, Mion, Zinn & Macpeak

[57] ABSTRACT

A toluene-insoluble gel polymer having a crosslinking density of at least $2.4 \times 10^{-6}$ obtained by polymerizing chloroprene or a mixture of chloroprene with a small amount of at least one copolymerizable monomer to a monomer conversion of at least 80 percent in the presence of a crosslinking agent selected from the group consisting of a compound represented by the following formula:

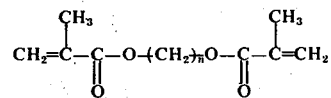

wherein $n$ is integer of from 1 to 8,

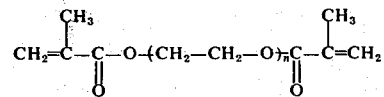

wherein $n$ is integer of from 2 to 4, divinylbenzene and diallyl phthalate and a process for the preparation thereof.

20 Claims, No Drawings

INSOLUBLE CHLOROPRENE POLYMER

This is a division of application Ser. No. 289,915, filed Sept. 18, 1972, now U.S. Pat. No. 3,876,732, in turn a division of Ser. No. 753,705, now U.S. Pat. No. 3,714,296.

Ordinary polychloroprene elastomers do not possess satisfactory processability characteristics especially for extrusion molding processes. Generally, it is not characterized by reduced die swell on extrusion through the rolls of the extrusion machines, by resistance to deformation, by smoothness of surface of extruded products, high velocity of extrusion and other factors as would be desirable. Accordingly, it is difficult to fabricate polychloroprene elastomers into shaped articles having complicated contours with any degree of precision by extrusion or by calendering. That is to say, that when manufacturing extruded products having a complicated figure and some resiliency, certain defects appear, namely, deformation, dimension changes, surface roughness, edge napping and the like.

It is an object of the present invention to provide a polychloroprene elastomer which is free from such defects and which is characterized by an improved processability, and excellent extrusion and molding properties. In more detail, the object of the present invention is to provide a polychloroprene elastomer which has excellent extrusion and molding properties as well as other improved processing properties such that it can be fabricated at a high extrusion rate into a smoothsurfaced extruded product which is free from any deformation or warp even though the product has a complicated cross-section.

SUMMARY OF THE INVENTION

The present invention comprises preparing a polychloroprene elastomer by blending a crosslinked toluene-insoluble gel-like polychloroprene (hereinafter referred to as the "gel polymer"), obtained by polymerizing chloroprene in the presence of a crosslinking agent, with a toluene-soluble sol-like polychloroprene (hereinafter referred to as "sol polymer"), obtained by ordinary polymerization procedures.

DETAILED DESCRIPTION OF PREFERRED EMBODIMENTS

The excellent extrusion qualities of the elastomer of the present invention are attributable to the intimate admixture of a crosslinked toluene insoluble gel polychloroprene with a toluene-soluble sol polychloroprene. Generally, it is necessary to blend the gel polymer and sol polymer in the weight ratio of from 20: 80 to 80: 20. Incorporation of the sol polymer in a proportion which exceeds the above range will result in an increased die swelling and deformation of the extruded product. On the other hand, incorporation in a lesser amount will result in unsatisfactory surface smoothness and a reduced flow property of the resulting elastomer and, consequently, a decreased extrusion rate.

The gel polymer suitably used in the practice of the present invention may be obtained by polymerizing chloroprene or a mixture of chloroprene with one or more comonomers in the presence of a bifunctional crosslinking agent such as glycol dimethacrylates of the formula

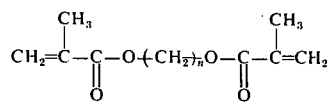

wherein $n$ is an integer of from 1 to 8, or

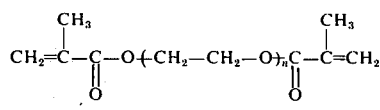

wherein $n$ is an integer of from 2 to 4. Examples of suitable crosslinking agents include ethylene glycol dimethacrylate (EDMA), trimethylene glycol dimethacrylate, tetramethylane glycol dimethacrylate (TDMA), diethylene glycol dimethacrylate (DEDMA), triethylene glycol dimethacrylate, tetraethylene glycol dimethacrylate (TEDMA) and the like; and divinylbenzene, divinyl ether, diallyl phthalate, divinylsulfone and the like. The excellent extrusion and molding properties of the elastomer of the present invention are obtainable by the use of a highly crosslinked gel polymer having a crosslinking density of at least $2.4 \times 10^{-6}$. If the density is less than $2.4 \times 10^{-6}$, the die swelling on extrusion will increase, the extrusion rate will decrease, the surface smoothness of the extruded product will be lost and, thus, the material will be poorly extruded. The crosslinking density of gel polymer depends on the type and quantity of crosslinking agent used, the degree of monomer to polymer conversion and other factors, and, therefore, the desired value is obtainable by properly adjusting these factors.

The swelling index and crosslinking density of the crosslinked gel polymer are determined in the following manner: The weight Wa of a sample is weighed by means of a chemical balance and the sample is soaked in about 100 cc of toluene contained in a stoppered 100 cc measuring flask. The container is allowed to stand in a thermostat controlled bath of 30°C. After reaching swelling equilibrium, the sample is removed from the toluene, lightly wiped with filter paper, and quickly weighed. The weight (WB) after swelling was noted and the swelling index (Q) was calculated by the equation $$Q = \frac{Wa}{Wb} - 1 \quad \frac{P_1}{P_2}$$

where $P_1$ is the density (g/cc) of gel chloroprene, $P_2$ is the density (g/cc) of toluene. The crosslinking density $\gamma$ is calculated from the value of swelling index by the P. J. Flory and A. M. Bueche's equation $$\gamma s = \frac{2.303 \log (1 - V2)\, V2}{2V1P_1\, (V_2^{1/3} - V_2/2)}$$

$$V_2 = \frac{1}{1 + (Wb/Wa - 1)(P_1/P_2)}$$

where $V_1$ is the volume fraction of solvent toluene, $V_2$ is the volume fraction of polychloroprene in the swollen gel and $\mu$ is interaction coefficient between polychoroprene and solvent.

The sol polymer used in the present invention may be obtained by polymerizing chloroprene or a mixture of chloroprene with small amounts of one or more copolymerizable monomers in the presence of an aliphatic mercaptan such as n-dodecylmercaptan. The resulting polymer is substantially gel-free and has a Mooney viscosity ($ML_{1+4}$) at 100°C. of at least 15.

In the present invention there may be used as a comonomer copolymerizable with chloroprene, e.g., styrene, vinyltoluene butadiene, isoprene 2,3-dichlorobutadiene-1,3, methyl vinyl ketone, methyl acrylate, ethyl acrylate, methyl methacrylate, ethyl methacrylate, and acrylonitrile.

The gel polymer and sol polymer thus obtained are blended in the form of a latex in the proportion as mentioned above and the mixture is isolated by freeze coagulation or by similar conventional techniques or by drum drying to obtain a polychloroprene elastomer having a Mooney viscosity ($ML_{1+4}$) at 100°C. of 30 to 70, preferably of 40 to 60.

The chloroprene elastomer thus obtained is thixotropic namely, when the elastomer is directly dissolved in benzene only the sol component dissolves and the gel component remains undissolved, when the elastomer is dissolved in benzene after mastication on a roll it dissolves entirely providing a turbid benzene solution which insolubilizes again after a few hours when allowed to stand still at room temperature. The gel polymer by itself is not solubilized by mastication, and this is a peculiar property obtained by blending with a low molecular sol polymer. All gel polymers do not exhibit such property when blended with a sol polymer, for instance, a gel polymer prepared by treating a chloroprene rubber with a peroxide will not exhibit such property.

The greatest characteristic of the rubber obtained by blending a gel polymer with a sol polymer in accordance with the present invention is the thixotropic property as mentioned above. It seems that the excellent extrusion molding property is attributable to this peculiar property since the low molecular sol polymer acts as a plasticizer on extrusion and the thixotropic gel polymer acts to prevent deformation, shrinkage and swelling. As a result of the interaction of the two polymers, the elastomer of the present invention exhibits good flow properties and good processability on extrusion and provides a good extruded product having a reduced deformation and die swelling tendency.

The present invention will now be illustrated by the following example which is not intended to be limiting in any manner. All parts are by weight.

EXAMPLE

A. Preparation of sol polymer:

A polymerization mixture of the following recipe was charged into a stirred jacketed polymerization vessel and gradually heated, with stirring, to 40°C. over a period of one hour. A mixed aqueous solution of 0.25% of potassium persulfate and 0.025% of sodium anthraquinone-$\beta$-sulfonate was added to the mixture as a polymerization catalyst. Polymerization was continued to a predetermined conversion.

| Chloroprene | 95–100(parts) |
|---|---|
| Other monomer | 5–0 |
| Disproportionated rosin | 4 |
| n-Dodecylmercaptan | 0.3 |
| Formaldehyde-sodium naphthalene sulfonate condensation product | 0.8 |
| Sodium hydroxide | 0.8 |
| Water | 150 |

The reaction was stopped by the addition of an emulsion containing 0.03% of phenothiazine and 0.03% of tert-butylcatechol. Unreacted chloroprene was then eliminated at 60°C. under an absolute pressure of 180 mm. Hg. Thus, there was obtained a toluene-soluble polychloroprene latex.

B. Preparation of the gel polymer:

A polymerization mixture as follows was polymerized in a stirred, jacketed polymerization vessel to a predetermined conversion and post-treated in the similar manner as in the preparation of the sol polymer.

| Chloroprene | 98 – 100(parts) |
|---|---|
| Other monomer | 2 – 0 |
| Disproportionated rosin | 3.5 |
| n-Dodecylmercaptan | 0.2 – 0.35 |
| Formaldehyde-sodium naphthalene sulfonate condensation product | 0.8 |
| Sodium hydroxide | 0.8 |
| Crosslinking agent | 3 – 7 |
| Water | 150 |

C. Blend of sol polymer and gel polymer:

The sol polymer latex and gel polymer latex thus obtained were mixed together in a latex state to a predetermined proportion, coagulated on the surface of a rotary drum through which was circulated a brine at a temperature of −20° to −10°C. The resulting film was washed with water and dried at 100°C. to 150°C. to obtain a blend. The polymer blend thus obtained was compounded in accordance with the following recipe.

| Polymer blend | 100(parts) |
|---|---|
| Phenyl-$\alpha$-naphthylamine | 1.0 |
| Magnesium oxide | 4.0 |
| Zinc oxide | 5.0 |
| 2-Mercaptoimidazoline | 0.35 |

The compound thus formed was extruded by means of a Koka-type flow tester and, thereby, the extrusion rate and the die swelling (ratio of the average outer diameter of the extruded product to the diameter of the extrusion die) were measured. The results were summarized in Table 1.

The test conditions by the Koka-type flow tester were as follows:

| Die | 1.0 mm $\phi$ × 1.0 mm |
|---|---|
| Load | 60 Kg/cm$^2$ |
| Temperature | 100°C. |

For comparison, a gel polymer of crosslinking density of $0.6 \times 10^{-6}$ was obtained in the same manner as in the specimen E-9 in the Table 1, except that polymerization was stopped at a conversion of 70% and was subjected to the same test. In this case, the extrusion rate was $9.4 \times 10^{-3}$ cc/sec., the die swelling was 2.05. The resulting surface smoothness was poor.

TABLE 1

|  |  | E-1 | 2 | 3 | 4 | 5 | 6 | 7 | 8 | E-9 | 10 | 11 | 12 |
|---|---|---|---|---|---|---|---|---|---|---|---|---|---|
| Gel Polymer | Crosslinking Agent | EDMA 3.0 | EDMA 5.0 | EDMA 7.0 | EDMA 4.0 | EDMA 4.5 | TDMA 5.0 | DEDMA 4.0 | TEDMA 5.0 | DVB 5.0 | DVB 5.0 | DVB 5.0 | DAP 7.0 |
|  | Monomer Composition | CP | CP | CP | CP98 2,3 DCBD 2 | CP | CP | CP | CP | CP | CP | CP | CP |
|  | n-Dodecyl-mercaptan | 0.2 | 0.3 | 0.35 | 0.25 | 0.25 | 0.25 | 0.25 | 0.25 | 0.3 | 0.3 | 0.3 | 0.3 |
|  | Conversion | 90 | 98 | 97 | 93 | 90 | 91 | 95 | 93 | 80 | 90 | 95 | 80 |
|  | Crosslinking density $\times 10^6$ | 10.7 | 25.0 | 31.3 | 13.5 | 14.6 | 17.2 | 30.4 | 22.7 | 2.4 | 8.2 | 22.0 | 4.2 |
| Sol Polymer | Monomer Composition | CP | CP | CP | CP | CP 95 St 5 | CP | CP | CP | CP | CP | CP | CP |
|  | Mooney viscosity $ML_{1+4}$ (100°C) | 25.5 | 22.5 | 20.0 | 24.5 | 23.0 | 23.0 | 21.0 | 23.0 | 23.0 | 22.5 | 24.5 | 21.0 |
| Compound | Gel polymer/Sol polymer blend ratio | 54/46 | 52/48 | 51/49 | 54/46 | 53/47 | 54/46 | 52/48 | 54/46 | 0/50 | 50/50 | 0/50 | 50/50 |
|  | Mooney viscosity of blend $ML_{1+4}$ (100°C) | 48.5 | 49.5 | 51.5 | 50.5 | 51.5 | 49.0 | 48.5 | 51.0 | 49.0 | 50.5 | 48.5 | 51.0 |
|  | Extrusion rate cc/sec. ($\times 10^3$) | 28.2 | 39.8 | 37.1 | 31.4 | 37.5 | 35.3 | 36.1 | 35.4 | 20.0 | 27.0 | 28.9 | 24.5 |
|  | Die Swelling | 1.27 | 1.07 | 1.05 | 1.20 | 1.26 | 1.13 | 1.12 | 1.18 | 1.60 | 1.35 | 1.10 | 1.52 |
|  | Surface Smoothness | Exc. | Exc. | Exc. | Exc. | Exc. | Exc. | Exc. | Exc. | good | Exc. | Exc. | Exc. |

DVB: Divinylbenzene
DAP: Diallyl phthalate
EDMA: Ethylene glycol dimethacrylate
TDMA: Tetramethylene glycol dimethacrylate
DEDMA: Diethylene glycol dimethacrylate
TEDMA: Tetraethylene glycol dimethacrylate
CP: Chloroprene
2.3DCBD: 2,3-dichlorobutadiene-1,3
St: Styrene As evident from the Table 1, polychloroprene elastomers prepared using a gel polymer having a density of crosslinking of at least $2.4 \times 10^{-6}$ are extrudable at high extrusion rates without difficulty. The extruded product is characterized by a smooth surface. The elastomer prepared using a gel polymer of a crosslinking density of $0.6 \times 10^{-6}$, which is outside the scope of the present invention, has poor extrusion characteristics.

What is claimed is:

1. A toluene-insoluble gel polymer having a crosslinking density of at least $2.4 \times 10^{-6}$ obtained by polymerizing chloroprene or a mixture of chloroprene with a small amount of at least one copolymerizable monomer to a monomer conversion of at least 80 percent in the presence of a crosslinking agent selected from the group consisting of a compound represented by the following formula:

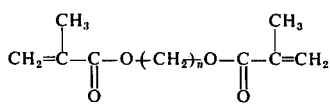

wherein $n$ is integer of from 1 to 8,

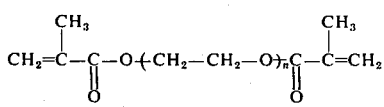

wherein $n$ is integer of from 2 to 4, divinylbenzene and diallyl phthalate.

2. A toluene-insoluble gel polymer of claim 1, wherein the crosslinking agent is ethylene glycol dimethacrylate.

3. A toluene-insoluble gel polymer of claim 1, wherein the crosslinking agent is trimethylene glycol dimethacrylate.

4. A toluene-insoluble gel polymer of claim 1, wherein the crosslinking agent is tetramethylene glycol dimethacrylate.

5. A toluene-insoluble gel polymer of claim 1, wherein the crosslinking agent is diethylene glycol dimethacrylate.

6. A toluene-insoluble gel polymer of claim 1, wherein the crosslinking agent is triethylene glycol dimethacrylate.

7. A toluene-insoluble gel polymer of claim 1, wherein the crosslinking agent is tetraethylene glycol dimethacrylate.

8. A toluene-insoluble gel polymer of claim 1, wherein the monomer copolymerizable with chloroprene is a monomer selected from the group consisting of styrene, vinyltoluene, butadiene, isoprene, 2,3-dichlorobutadiene-1,3, methyl vinyl ketone, methyl acrylate, ethyl acrylate, methyl methacrylate, ethyl methacrylate and acrylonitrile.

9. A toluene-insoluble gel polymer of claim 1, wherein the monomer copolymerizable with chloroprene is styrene.

10. A toluene-insuluble gel polymer of claim 1, wherein the monomer copolymerizable with chloroprene is 2,3-dichlorobutadiene-1,3.

11. A process for preparing a toluene-insoluble gel polymer comprising polymerizing chloroprene or a mixture of chloroprene with a small amount of at least one copolymerizable monomer in the presence of a cross-linking agent selected from the group consisting of a compound represented by the following formula:

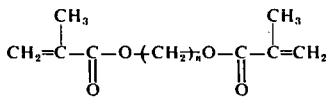

wherein n is integer of from 1 to 8,

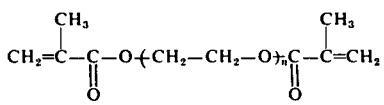

wherein n is integer of from 2 to 4,
divinylbenzene and diallylphthalate to a crosslinking density of at least $2.4 \times 10^{-6}$ and a monomer conversion of at least 80 percent.

12. A process of claim 11, wherein the crosslinking agent is ethylene glycol dimethacrylate.

13. A process of claim 11, wherein the crosslinking agent is trimethylene glycol dimethacrylate.

14. A process of claim 11, wherein the crosslinking agent is tetramethylene glycol dimethacrylate.

15. A process to claim 11, wherein the crosslinking agent is diethylene glycol dimethacrylate.

16. A process of claim 11, wherein the crosslinking agent is triethylene glycol dimethacrylate.

17. A process of claim 11, wherein the crosslinking agent is tetraethylene glycol dimethacrylate.

18. A process of claim 11, wherein the monomer copolymerizable with chloroprene is a monomer selected from the group consisting of styrene, vinyltoluene, butadiene, isoprene, 2,3-dichlorobutadiene-1,3, methyl vinyl ketone, methyl acrylate, ethyl acrylate, methyl methacrylate, ethyl methacrylate and acrylonitrile.

19. A process of claim 11, wherein the monomer copolymerizable with chloroprene is styrene.

20. A process of claim 11, wherein the monomer copolymerizable with chloroprene is 2,3-dichlorobutadiene-1,3.

* * * * *